United States Patent
Bacon

(10) Patent No.: US 6,309,008 B1
(45) Date of Patent: Oct. 30, 2001

(54) PULL HANDLE MECHANISM FOR VEHICLE CAPS AND THE LIKE

(75) Inventor: Bruce C. Bacon, Rockford, MI (US)

(73) Assignee: Bauer Products, Inc., Grand Rapids, MI (US)

( * ) Notice: Subject to any disclaimer, the term of this patent is extended or adjusted under 35 U.S.C. 154(b) by 0 days.

(21) Appl. No.: 09/773,236

(22) Filed: Jan. 31, 2001

(51) Int. Cl.[7] .................................................. B62D 25/06
(52) U.S. Cl. ................................. 296/106; 296/56; 292/38
(58) Field of Search .................................... 296/163, 164, 296/26.04, 100.02, 106, 56, 146.8; 292/336.3, 38, 347, DIG. 29, DIG. 43, DIG. 65

(56) References Cited

U.S. PATENT DOCUMENTS

| | | | |
|---|---|---|---|
| 145,835 | * | 12/1873 | Bissell . |
| D. 304,155 | | 10/1989 | Russell et al. . |
| D. 369,084 | | 4/1996 | McConnell et al. . |
| D. 371,500 | | 7/1996 | McConnell et al. . |
| D. 373,298 | | 9/1996 | Miehe et al. . |
| 1,593,011 | * | 7/1926 | Bourgon . |
| 2,022,718 | * | 12/1935 | Heins . |
| 3,027,188 | * | 3/1962 | Eichstadt . |
| 4,474,393 | * | 10/1984 | Kimura . |
| 4,850,209 | | 7/1989 | Weinerman et al. . |
| 5,174,456 | * | 12/1992 | Grody . |
| 5,564,295 | | 10/1996 | Weinerman et al. . |
| 5,586,795 | | 12/1996 | Sasaki . |
| 6,108,979 | * | 8/2000 | Saffran et al. . |

* cited by examiner

Primary Examiner—Joseph D. Pape
Assistant Examiner—Scott Carpenter
(74) Attorney, Agent, or Firm—Price, Heneveld, Cooper, DeWitt & Litton

(57) ABSTRACT

A pull handle mechanism for vehicle caps and the like of the type having an access door with at least one cable actuated closure latch, includes a base, with an exterior portion received through a mounting hole in the access door and an interior portion configured with an axially extending slide cavity. A retainer engages the exterior portion of the base to mount the pull handle mechanism in the access door. A handle having a scoop-shaped exterior portion with a downwardly opening finger recess, includes a rearwardly extending shaft slidingly received in the slide cavity to permit longitudinal reciprocation therebetween. A biasing member is positioned between the base and the handle, and urges the same together. A cable mount connects the actuator cable with the handle, such that pulling the handle outwardly tenses the actuator cable and releases the closure latch to permit the access door to be pivoted to an open position.

27 Claims, 3 Drawing Sheets

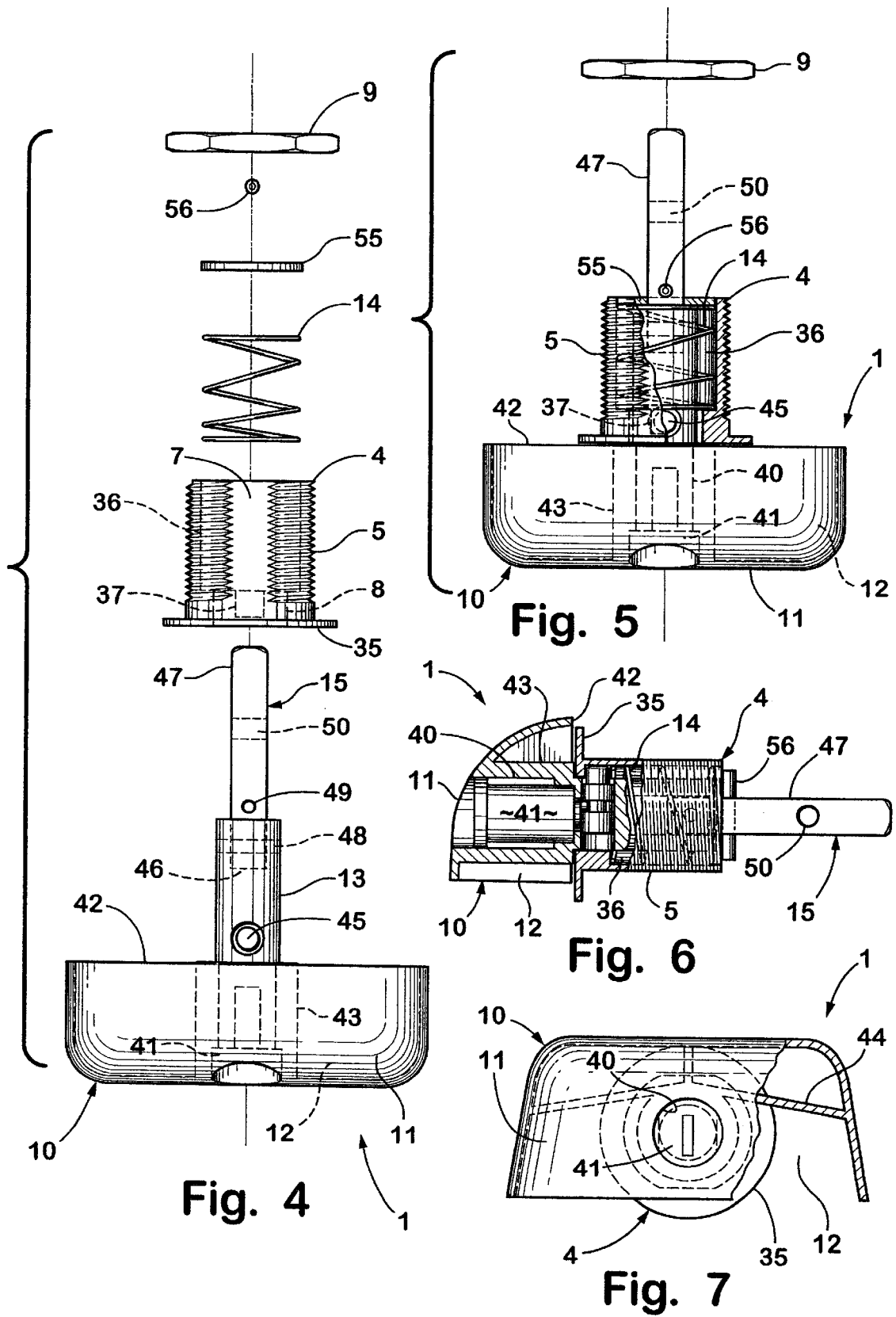

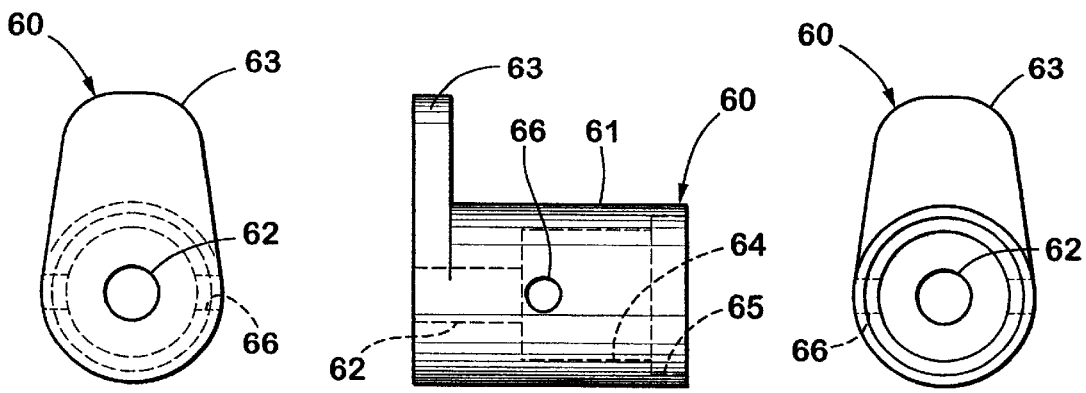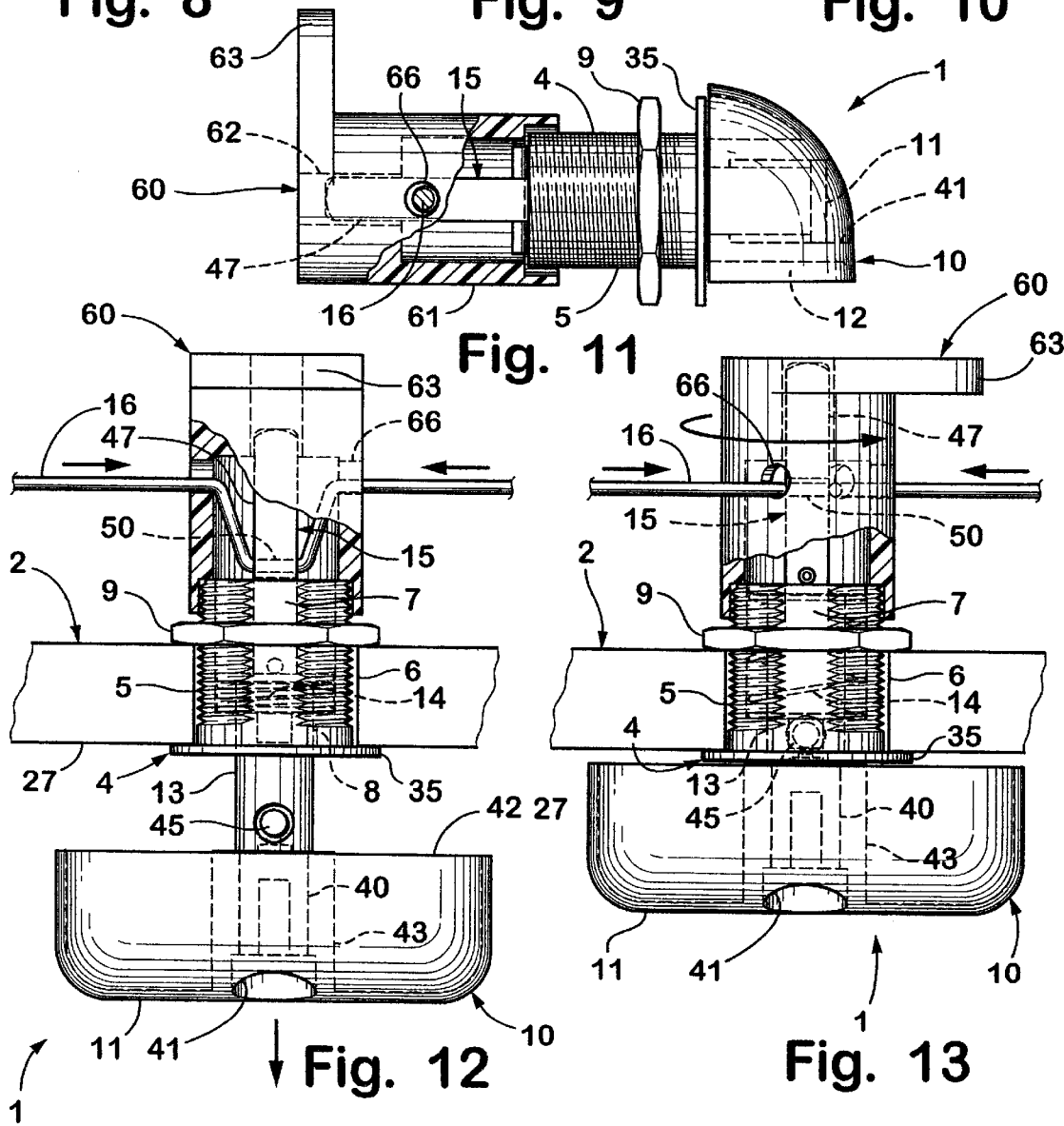

PULL HANDLE MECHANISM FOR VEHICLE CAPS AND THE LIKE

BACKGROUND OF THE INVENTION

The present invention relates to handle mechanisms, and in particular to a pull handle mechanism for vehicle caps and the like.

Vehicle caps are well known in the art, and serve to selectively enclose an otherwise open portion of a vehicle, such as the open bed of a pickup truck. Such vehicle caps are typically equipped with at least one hinged access door which is shiftable between open and closed positions, and includes at least one closure latch operably connected with an actuator cable to selectively retain the access door in the closed position. Normally, the access door is positioned at the rear of the vehicle cap, and is pivotally mounted thereto along the upper edge of the access door, such that the access door swings upwardly to the open position to access the interior of the vehicle bed.

Heretofore, the handle mechanisms used to manipulate the closure latches on the vehicle cap have normally been of the pivoting type, such as that illustrated in U.S. Pat. No. 5,586,795, wherein rotation of the handle member tenses and releases the actuator cable. Push button handle mechanisms have also been used for vehicle access doors. While such handle mechanisms are generally effective, they can be somewhat cumbersome to operate, and have a relatively complex construction that is subject to wear and malfunction, particularly in inclement weather conditions.

SUMMARY OF THE INVENTION

One aspect of the present is a pull handle mechanism for vehicle caps and the like of the type having a hinged access door with at least one cable actuated closure latch. The handle mechanism includes a base member having an exterior portion thereof closely received in an associated mounting hole, and an interior portion configured with an axially extending slide cavity. A retainer engages the exterior portion of the base member adjacent an interior area thereof, and securely mounts the pull handle mechanism in the mounting hole of the access door. A handle member having a scoop-shaped exterior portion with a finger recess includes a rearwardly extending shaft slidingly received in the slide cavity to permit longitudinal reciprocation therebetween. A biasing member is positioned between the base member and the handle member, and urges the same together. A cable mount member connects the cable actuator with the handle member, such that pulling the handle member outwardly away from the access door tenses the actuator cable and releases the closure latch to permit the access door to be pivoted to the open position.

The principle objects of the present invention are to provide a pull handle mechanism for vehicle caps and the like which has a very natural and comfortable pull motion actuation, as well as an uncomplicated construction that is both very durable and economical to manufacture and install. Preferably, the pull handle mechanism includes a base member that quickly and easily mounts in a single through hole in the access door to provide sole support for the mechanism. A scoop-shaped handle with a finger recess can be easily grasped and pulled outwardly using a quite natural and comfortable motion. A biasing member automatically returns the handle to the locked position when the handle is released. The handle mechanism is efficient in use, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 4 is an exploded top plan view of the handle mechanism.

FIG. 5 is a top plan of the handle mechanism.

FIG. 6 is a side elevational view of the handle mechanism.

FIG. 7 is a front elevational view of the handle mechanism.

FIG. 8 is an end elevational view of a safety handle portion of the handle mechanism.

FIG. 9 is a side elevational view of the safety handle.

FIG. 10 is an end elevational view of the safety handle.

FIG. 11 is a side elevational view of the pull handle mechanism shown with the safety handle installed.

FIG. 12 is a top plan view of the handle mechanism shown installed in an associated access door, and shifted to the extended position to release associated cable actuated closure latches.

FIG. 13 is a top plan view of the handle mechanism shown installed in the access door with the safety handle rotated to release the cable actuated closure latches from the interior of the vehicle cap.

DETAILED DESCRIPTION OF THE PREFERRED EMBODIMENTS

Figure 1:
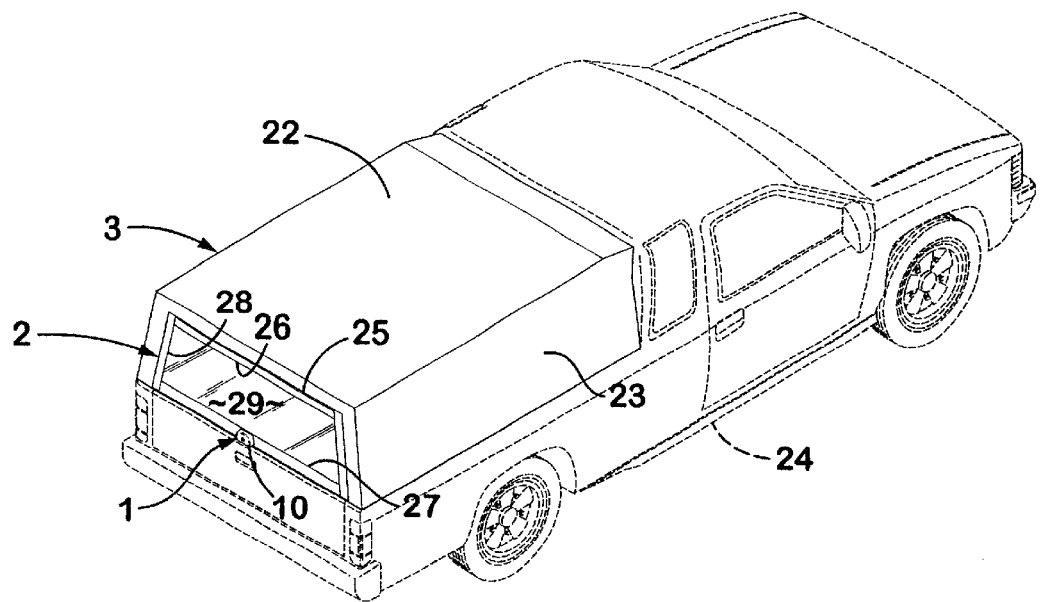
FIG. 1 is a partial schematic perspective view of a vehicle cap having a pull handle mechanism embodying the present invention.
Figure 2:
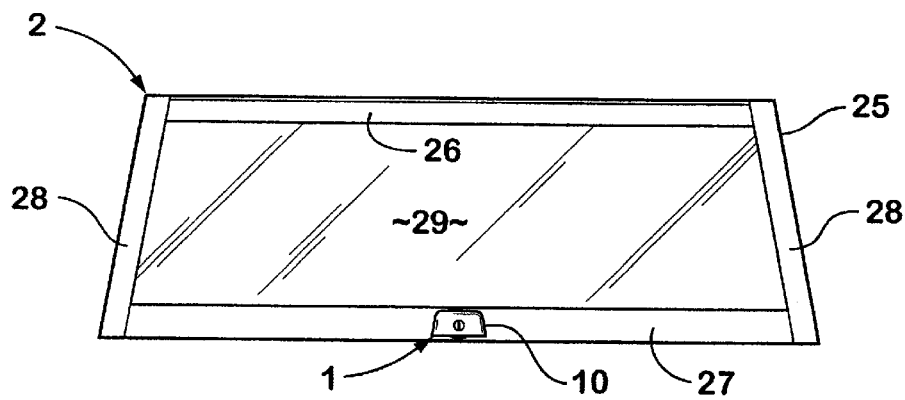
FIG. 2 is a front elevational view of an access door having the pull handle mechanism installed therein.

For purposes of description herein, the terms "upper", "lower", "right", "left", "rear", "front", "vertical", "horizontal" and derivatives thereof shall relate to the invention as oriented in FIG. 1. However, it is to be understood that the invention may assume alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting, unless the claims expressly state otherwise.

Figure 3:
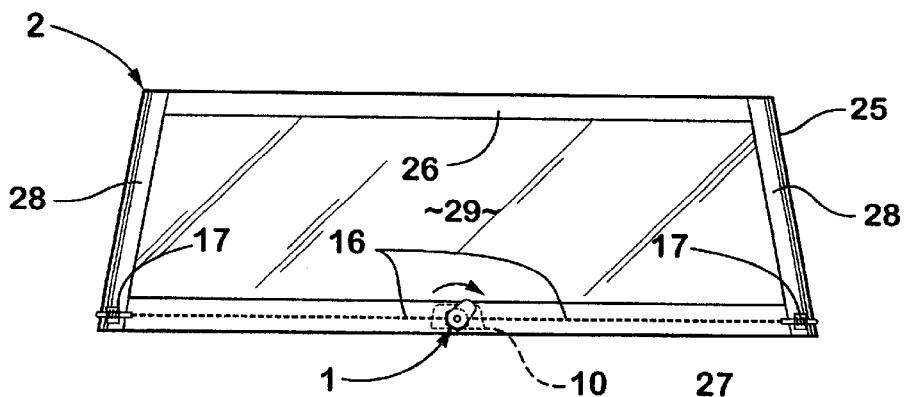
FIG. 3 is a rear elevational view of the access door shown in FIG. 2.

The reference numeral 1 (FIG. 1) generally designates a pull handle mechanism embodying the present invention. In the illustrated example, pull handle mechanism 1 is shown installed in a hinged access door 2 of a vehicle cap 3. Pull handle mechanism 1 includes a base member 4 (FIGS. 11–13) having an exterior portion thereof 5 received through a mounting hole 6 in access door 2 and an interior portion thereof 7 configured with an axially extending slide cavity 8. A retainer 9 engages the exterior portion of base member 4 to mount pull handle mechanism 1 in access door 2. A handle member 10 has a scoop-shaped exterior portion 11 with a finger recess 12, and includes a rearwardly extending shaft 13 slidingly received in slide cavity 8 to permit longitudinal reciprocation therebetween. A biasing member 14 is positioned between base member 4 and handle member 10, and urges the same together. A cable mount 15 connects the actuator cable 16 with handle member 10, such that pulling handle member 10 outwardly tenses actuator cable 16, and releases associated closure latches 17 (FIG. 3) to permit access door 2 to be pivoted to an open position.

In the example illustrated in FIG. 1, pull handle mechanism 1 is shown mounted in the access door 2 of a conventional vehicle cap 3 of the type having a top 22, opposite side panels 23 and an open rearward side in which access door 2 is mounted. The illustrated vehicle cap 3 is shown positioned over the open bed of an associated pickup truck 24. The illustrated access door 2 includes a perimeter frame 25 having an upper member 26, a lower member 27, and opposite side members 28 which are rigidly interconnected to receive and retain therein a transparent panel 29, such as the illustrated glass. The mounting hole 6 is positioned in the lower member 27 of access door frame 25 and defines a single central aperture in which pull handle mechanism 1 is detachably retained. The access door 2 shown in FIG. 3 includes a pair of slam or rotary latches 17 mounted in frame 25 adjacent the lower corners thereof, which selectively engage adjacent portions of vehicle cap 3 to retain access door 2 in the locked position. Tension applied to actuator cable 16 causes both latches 17 to simultaneously release to permit access door 2 to be opened.

The illustrated base member 4 (FIGS. 4–7) includes a threaded exterior portion 5 which is shaped to be closely received within the mounting hole 6 in access door frame 25. Base member 4 includes a radially outwardly extending collar or circular flange 35 on the exterior side thereof, which is shaped to abut against the exterior surface of access door frame 25. The illustrated slide cavity 8 is in the form of a cylindrically shaped aperture disposed adjacent the exterior end of base member 4, and is sized to closely receive therein the shaft 13 of handle member 10 for longitudinal sliding reciprocation. The interior end of base member 4 includes an enlarged cylindrical cavity 36, which as discussed in greater detail hereinafter, is designed to receive biasing member 14 therein. Base member 4 includes a radially extending lock pin aperture 37 configured to closely receive an associated lock bolt 45 therein, as discussed below.

The illustrated handle member 10 (FIGS. 4–7) is scoop-shaped, with finger recess 12 opening downwardly. Handle member 10 includes a central, horizontally extending aperture 40 in which a key lock 41 is mounted. The scoop-shaped exterior 11 of handle member 10 protrudes away from the access door 2 and includes an inverted U-shaped rear edge 42 which is disposed parallel and adjacent to the collar 35 of base member 4. In the illustrated example, handle member 10 has an integrally formed central barrel member 43 with an internal laterally extending rib 44 to rigidify the same. The illustrated key lock 41 includes a vertically oriented lock bolt 45 which shifts vertically upwardly when locked to be received in a mating aperture 37 in base member 4 to prevent handle member 10 from be moved when key lock 41 is in the locked position. In the illustrated example, shaft 13 is formed integrally with handle member 10, and includes a socket 46 in the interior end thereof, having a square lateral cross-sectional configuration. A rigid elongate insert 47 having a square lateral cross-sectional configuration has its interior end closely received within socket 46, and extends rearwardly therefrom. A mounting pin 48 extends laterally through the rearward portion of shaft 13 and the interior end of insert 47 to rigidly interconnect the same. Insert 47 includes a vertically extending fastener aperture 49 positioned adjacent the interior end of shaft 13, as well as a horizontally extending cable mount aperture 50 disposed adjacent the interior end of insert 47. Aperture 50 is shaped to receive actuator cable 16 therethrough and define cable mount 15.

The illustrated biasing member 14 is in the form of a compression coil spring, shaped to be received within the enlarged cavity 36 in base member 4. As described in greater detail hereinafter, coil spring 14 is positioned around insert 47 and retained in place by an associated washer 55 and mounting pin 56. The illustrated retainer 9 is in the form of a nut having a threaded interior shaped to be received over the threaded exterior portion 5 of base member 4, and engages the interior surface of access door 2 as illustrated in FIG. 12 to capture and securely retain pull handle mechanism 1 in mounting hole 6.

An interior safety handle 60 (FIGS. 8–13) is provided to release the closure latches 17 from the interior of vehicle cap 3 even when key lock 41 is in the locked position. The illustrated safety handle 60 includes a cylindrical body 61 having a central circular hole 62 extending axially therethrough. Central hole 62 is shaped to closely receive insert 47 therethrough to rotatably mount safety handle 60 to the interior side of pull handle mechanism 1. Safety handle 60 includes a radially outwardly extending lobe portion 63 shaped to facilitate grasping and rotating safety handle 60 on insert 47. The interior of safety handle body 61 has a hollow portion 64 with an outwardly oriented circular recess 65 shaped to closely receive the exterior portion 5 of base member 4 therein. A cable attachment hole 66 extends laterally through a central portion of safety handle body 61, and is shaped for alignment with the cable mounting hole 50 in insert 47 to receive actuator cable 16 therethrough. Safety handle 60 thereby acts as a guide for actuator cable 16 and provides leverage to actuate closure latches 17.

As best illustrated in FIGS. 4–7, the illustrated pull handle mechanism 1 is assembled by mounting insert 47 in the socket 46 of handle shaft 13, and inserting connector pin 48 to securely interconnect the same. Handle member 10 is inserted into the slide cavity 8 in base member 4, such that lock bolt 45 aligns with the lock pin aperture 37 in base member 4. Coil spring 14 is inserted into the interior end of base member 4, and washer 55 is assembled over insert 47 to pre-tense coil spring 14, with lock pin 56 being insert through aperture 49 to retain the assembly together. Coil spring 14 resiliently urges handle member 10 toward base member 4, such that when handle member 10 is released, it automatically shifts back to the closed position.

Pull handle mechanism 1 (FIGS. 11–13) is installed in access door 2 by simply inserting base member 4 into the mounting hole 6 in access door frame 25. Hexagonal retainer nut 9 is then positioned over the exterior portion 5 of base member 4 and tightened to securely retain pull handle mechanism 1 on access door 2. Safety handle 60 is then mounted on the interior end of insert 47, and the lateral apertures 66 in safety handle 60 are aligned with the mating aperture 50 in insert 47, and actuator cable 16 is inserted through apertures 50 and 66. Actuator cable 16 thereby retains safety handle 60 on insert 47, but permits safety handle 60 to rotate thereon.

In operation, to open access door 2 from the exterior of vehicle cap 3, the user simply pulls rearwardly on handle member 10, overcoming the biasing force of coil spring 14, and shifting handle member 10 outwardly relative to base member 4, thereby tensing actuator cable 16, and releasing closure latches 17. Access door 2 can then be pivoted upwardly to its open position. Once handle member 10 is released, coil spring 14 shifts the same back to its normally locked position, such that when access door 2 is pivoted to the closed position, it automatically locks in place. Key lock 41 can be rotated to prevent handle member 10 from being shifted outwardly, and thereby prevents access to the interior of vehicle cap 3. However, access door 2 can be opened from the interior of vehicle cap 3 even if key lock 41 is in the locked position by simply rotating safety handle 60, which tenses actuator cable 16 and causes closure latches 17 to unlock.

Pull handle mechanism 1 has a very natural and comfortable pull motion actuation, as well as an uncomplicated construction which is both very durable and economical to manufacture and install.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. In a vehicle cap of the type having a hinged access door shiftable between an open position and a closed position, with at least one closure latch operably connected with an actuator cable to selectively retain said access door in said closed position, the improvement of a pull handle mechanism, comprising:

a mounting hole extending through said access door for mounting said pull handle mechanism to said access door;

a base member having an exterior-portion thereof closely received in said mounting hole, and an interior portion thereof configured with an axially extending slide cavity;

a retainer engaging said base member, and securely mounting said pull handle mechanism in said mounting hole of said access door;

a handle member having a scoop-shaped exterior portion thereof with a finger recess shaped to grasp said handle member, and a rearwardly extending shaft portion slidingly received in said slide cavity of said base member to permit longitudinal reciprocation therebetween;

a biasing member positioned operably between said base member and said handle member, and resiliently urging said handle member toward said base member; and a cable mount member connecting said actuator cable with said handle member, whereby pulling said handle member outwardly away from said access door tenses said actuator cable and releases said closure latch to permit said access door to be pivoted to said open position.

2. A vehicle cap as set forth in claim 1, including:

a key lock positioned in said handle member, and including a shiftable lock bolt which selectively engages said base member to prevent reciprocation of said handle member in a locked condition.

3. A vehicle cap as set forth in claim 2, including:

an interior safety handle connected with said actuator cable, and supported on said handle member adjacent an interior portion thereof, such that said safety handle can be manipulated from within the interior of said vehicle cap to release said closure latch even when said handle member is in said locked condition.

4. A vehicle cap as set forth in claim 3, wherein:

said shaft portion of said handle member includes a socket disposed in an interior end thereof, and including
   a rigid elongate insert mounted in said socket, and extending axially inwardly from said handle member.

5. A vehicle cap as set forth in claim 4, wherein:

said insert includes a laterally extending aperture therethrough in which an associated portion of said actuator cable is received to define said cable mount member.

6. A vehicle cap as set forth in claim 5, wherein:

said safety handle includes an axially extending central aperture receiving said insert therein to rotatably support said safety handle on said insert.

7. A vehicle cap as set forth in claim 6, wherein:

said safety handle includes a radially outwardly extending lobe portion shaped to facilitate grasping said safety handle.

8. A vehicle cap as set forth in claim 7, wherein:

said access door includes a lower frame member; and
   said mounting hole comprises a single aperture through said lower frame member.

9. A vehicle cap as set forth in claim 8, wherein:

said access door includes a perimeter frame with a transparent panel mounted therein.

10. A vehicle cap as set forth in claim 1, wherein:

said finger recess is downwardly opening to facilitate grasping.

11. A vehicle cap as set forth in claim 10, wherein:

said retainer comprises a nut threadedly engaging the exterior portion of said base member.

12. A vehicle cap as set forth in claim 11, wherein:

said biasing member comprises a coil spring.

13. A vehicle cap as set forth in claim 1, including:

an interior safety handle connected with said actuator cable, and supported on said handle member adjacent an interior portion thereof, such that said safety handle can be manipulated from within the interior of said vehicle cap to release said closure latch even when said handle member is in said locked condition.

14. A vehicle cap as set forth in claim 1, wherein:

said shaft portion of said handle member includes a socket disposed in an interior end thereof, and including
    a rigid elongate insert mounted in said socket, and extending axially inwardly from said handle member.

15. A vehicle cap as set forth in claim 1, wherein:

said handle member includes a laterally extending aperture therethrough in which an associated portion of said actuator cable is received to define said cable mount member.

16. A vehicle cap as set forth in claim 1, wherein:

said access door includes a lower frame member; and
    said mounting hole comprises a single aperture through said lower frame member.

17. A vehicle cap as set forth in claim 1, wherein:

said access door includes a perimeter frame with a transparent panel mounted therein.

18. A vehicle cap as set forth in claim 1, wherein:

said finger recess is downwardly opening to facilitate grasping.

19. A vehicle cap as set forth in claim 1, wherein:
said retainer comprises a nut threadedly engaging the exterior portion of said base member; and
said biasing member comprises a coil spring.

20. A pull handle mechanism for a hinged vehicle access door shiftable between an open position and a closed position, with at least one closure latch connected with an actuator cable to selectively retain the access door in said closed position, comprising:
a base member having an exterior portion thereof configured to be closely received in a through hole in the access door, and an interior portion thereof configured with an axially extending slide cavity;
a retainer engaging said base member, and positioned to securely mount said pull handle mechanism in the mounting hole in the access door;
a handle member having a scoop-shaped exterior portion thereof with a finger recess shaped to grasp said handle member, and a rearwardly extending shaft portion slidingly received in said slide cavity of said base member to permit longitudinal reciprocation therebetween;
a biasing member positioned operably between said base member and said handle member, and resiliently urging said handle member toward said base member; and
a cable mount member for connecting the actuator cable with said handle member, whereby pulling said handle member outwardly away from the access door tenses the actuator cable and releases said closure latch to permit the access door to be pivoted to the open position.

21. A pull handle mechanism as set forth in claim 20, including:
a key lock positioned in said handle member, and including a shiftable lock bolt which selectively engages said base member to prevent reciprocation of said handle member in a locked condition.

22. A pull handle mechanism as set forth in claim 21, including:
an interior safety handle supported on said handle member adjacent an interior portion thereof, and shaped for connecting the actuator cable therewith, such that said safety handle can be manipulated from within the interior of the vehicle cap to release the closure latch even when said handle member is in said locked condition.

23. A pull handle mechanism as set forth in claim 22, wherein:
said shaft portion of said handle member includes a socket disposed in an interior end thereof, and including
a rigid elongate insert mounted in said socket, and extending axially inwardly from said handle member.

24. A pull handle mechanism as set forth in claim 23, wherein:
said insert includes a laterally extending aperture therethrough shaped to receive an associated portion of the actuator cable therein to define said cable mount member.

25. A pull handle mechanism as set forth in claim 24, wherein:
said finger recess is downwardly opening to facilitate grasping.

26. A pull handle mechanism as set forth in claim 25, wherein:
said retainer comprises a nut threadedly engaging the exterior portion of said base member.

27. A pull handle mechanism as set forth in claim 26, wherein:
said biasing member comprises a coil spring.

* * * * *